(12) United States Patent
Norell et al.

(10) Patent No.: US 9,003,600 B2
(45) Date of Patent: Apr. 14, 2015

(54) VACUUM CLEANER WITH NOISE REDUCTION RECESSES

(75) Inventors: Neil N. Norell, Vestal, NY (US); Michael Z. Yurko, Endwell, NY (US)

(73) Assignee: Shop Vac Corporation, Williamsport, PA (US)

( * ) Notice: Subject to any disclaimer, the term of this patent is extended or adjusted under 35 U.S.C. 154(b) by 357 days.

(21) Appl. No.: 13/450,068

(22) Filed: Apr. 18, 2012

(65) Prior Publication Data

US 2013/0276261 A1    Oct. 24, 2013

(51) Int. Cl.
*A47L 9/14* (2006.01)
*A47L 9/00* (2006.01)

(52) U.S. Cl.
CPC ..................... *A47L 9/0081* (2013.01)

(58) Field of Classification Search
CPC ....... A47L 9/1683; A47L 5/28; A47L 9/1666; A47L 9/1691; A47L 9/127
USPC ................... 15/307, 319, 329, 339, 413, 347; 318/701, 602
See application file for complete search history.

(56) References Cited

U.S. PATENT DOCUMENTS

| 2,122,632 | A | 7/1938 | Baxter |
| 2,716,465 | A | 8/1955 | Meyerhoefer |
| 2,842,178 | A | 7/1958 | Solomon |
| 3,588,944 | A | 6/1971 | Fromknecht et al. |
| 3,619,850 | A | 11/1971 | Rideout et al. |
| 4,420,180 | A | 12/1983 | Dupont et al. |
| 4,701,969 | A | 10/1987 | Berfield et al. |
| 4,894,882 | A | 1/1990 | Toya |
| 6,311,366 | B1 | 11/2001 | Sepke et al. |
| 6,843,644 | B2 | 1/2005 | Rew et al. |
| 7,152,272 | B2 | 12/2006 | Rukavina et al. |
| 7,407,063 | B2 | 8/2008 | Rockwell, III |
| 2010/0083462 | A1* | 4/2010 | Norell et al. ................... 15/412 |

* cited by examiner

*Primary Examiner* — Robert Scruggs
(74) *Attorney, Agent, or Firm* — Marshall, Gerstein & Borun LLP

(57) ABSTRACT

A new vacuum cleaner that is adapted for use in a vehicle has a user-removable debris collection tank that has spaced recesses on the bottom that inhibit both fore-and-back movement of debris within the collection tank and side-to-side movement of debris within the collection tank. The recesses are located in opposed outer corners of the tank, and have lower surfaces that support the tank in a standing position. Raised sections divide each of the recesses into two corner recess sections and an offset recess section, and inhibit both fore-and-aft movement of debris within the recesses and side-to-side movement of debris within the recess sections. The offset recess section has tracks that curve in different directions from an intermediate position adjacent or near a side of the tank. The bottom of the tank is generally curved downwardly towards the sides of the tank.

10 Claims, 9 Drawing Sheets

VACUUM CLEANER WITH NOISE REDUCTION RECESSES

CROSS-REFERENCE TO RELATED APPLICATIONS

Not applicable.

BACKGROUND OF THE INVENTION

The present invention relates generally to vacuum cleaners, and in particular to vacuum cleaners that can be used in vehicles.

BRIEF SUMMARY

The applicants have developed a new vacuum cleaner that is adapted for use in a vehicle, and can be used for vacuuming the interior and/or a storage compartment of the vehicle. Like some prior known vacuum cleaners, the new vacuum cleaner has a user-removable debris collection tank.

Unlike prior known vacuum cleaners, the new vacuum cleaner has special features that inhibit the noise that could otherwise occur when debris moves around inside a vacuum cleaner when a vehicle changes speed (i.e., accelerates or brakes) or direction.

The new vacuum cleaner has a collection tank that has two or more spaced recesses on the bottom. While some previous vacuum cleaners not designed for use with vehicles may have had recesses or dividers on the bottom of the collection tank, no previously known prior vacuum cleaner had wall segments, like those disclosed here, that inhibit both fore-and-back movement of debris within the collection tank and side-to-side movement of debris within the collection tank.

In the illustrated product, further advantages are obtained by locating the recesses in opposed outer corners of the collection tank. The lower surfaces of these recesses support the collection tank in a standing position when the collection tank is removed from the rest of the vacuum cleaner.

Other advantages are obtained in the illustrated product by extending one or more raised sections through the recesses. These raised sections, which may curve convexly away from central portions of the bottom of the collection tank, divide the recesses into multiple recess sections, and inhibit both fore-and-aft movement of debris within the recesses and side-to-side movement of debris within the recess sections.

In the illustrated product, the raised sections are arranged so that they divide each of the recesses into two corner recess sections and an offset recess section. The offset recess section has two tracks that extend (or preferably curve) in different directions. One lateral side of the tracks is formed by wall segments on that recess and the other lateral side of the tracks is formed by other wall segments on that raised section. The tracks may extend from an intermediate position that is located adjacent or near the fore or aft side of the collection tank.

To help steer debris into the recessed sections, the bottom of the tank is generally curved downwardly towards the fore-and-aft sides of the tank.

BRIEF DESCRIPTION OF THE DRAWINGS

The invention may be better understood by referring to the accompanying drawings, in which.

DETAILED DESCRIPTION

Figure 1:
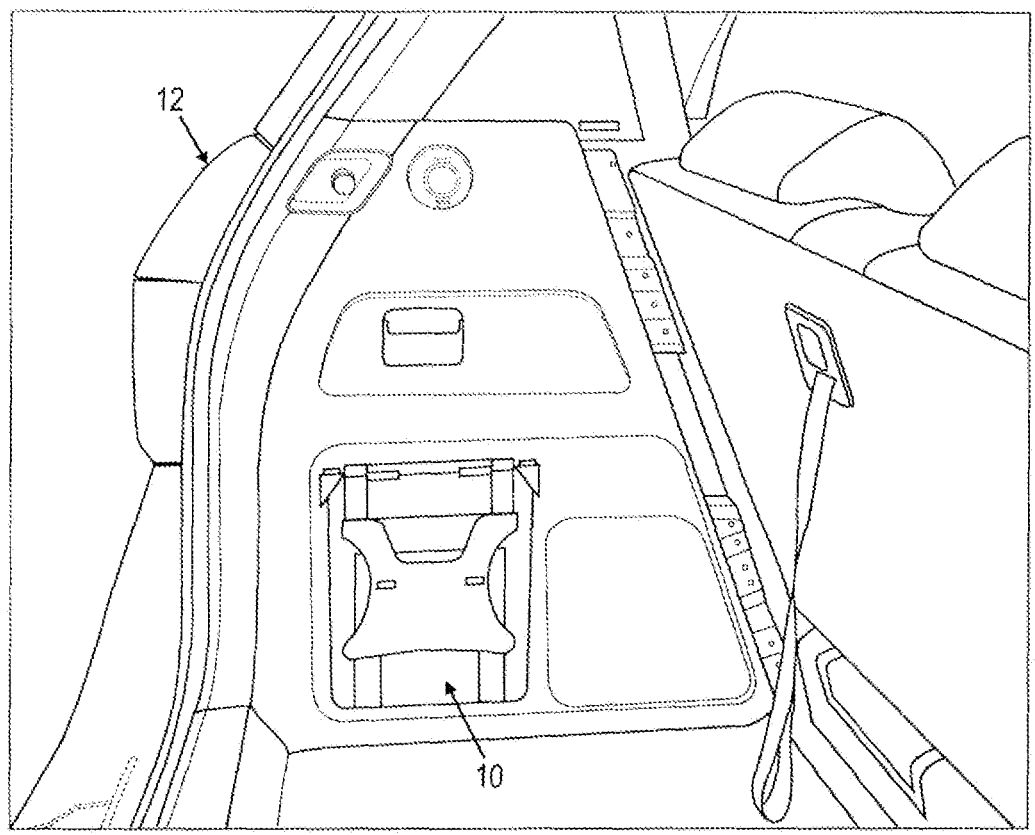
FIG. 1 is a perspective view of one embodiment of a vacuum cleaner that uses the invention, mounted in a vehicle.
Figure 4:
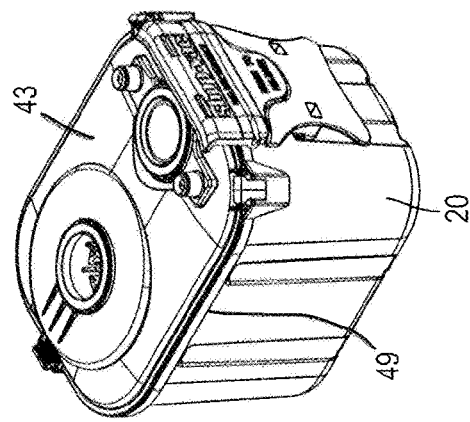
FIG. 4 is a perspective view of the tank removed from the rest of the vacuum cleaner.
Figure 3:
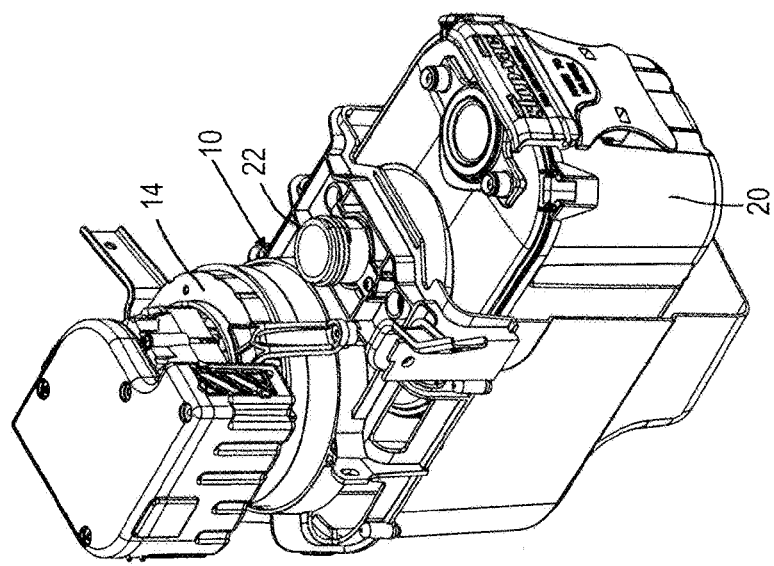
FIG. 3 is a perspective view of the vacuum cleaner, showing one position of a debris collection tank during its removal.
Figure 2:
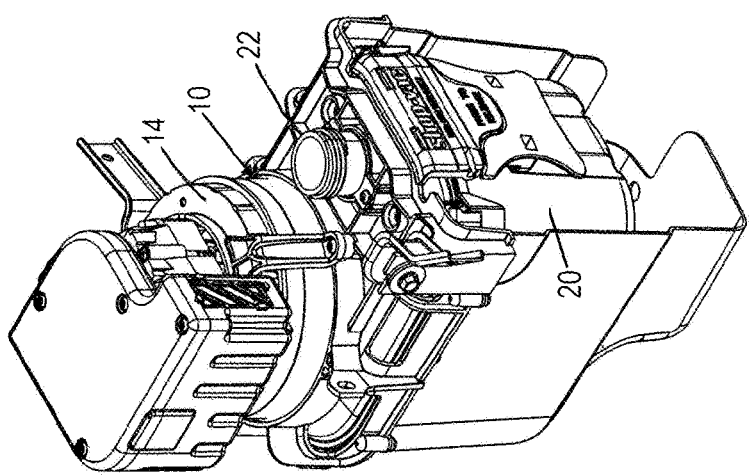
FIG. 2 is a perspective view of the vacuum cleaner removed from the vehicle.

The vacuum cleaner 10 seen in FIG. 1 is positioned within a vehicle 12, and can be used for vacuuming the interior and/or a storage compartment of the vehicle, such as a land vehicle, a watercraft, or an aircraft. As seen in FIGS. 2-5, the vacuum cleaner includes a power unit 14 and a user-removable debris collection tank 20.

The power unit 14 (FIGS. 2 and 3) provides the vacuum force for the vacuum cleaner 10, and includes a vacuum generator and a power source for that vacuum generator. A conventional vacuum generator and power source can be used. The vacuum generator can be, for example, a motorized fan or impeller. The power source can be a separate battery, a cable to the electrical system of the vehicle 12, or a combination of both.

The user-removable debris collection tank 20 is used for holding debris that is collected through a conventional vacuum hose (not shown) that removably connects to a hose port 22 on the vacuum cleaner 10. Although other configurations might be used, the debris collection tank seen in FIGS. 5-7 has a bottom 26 with generally planar fore and aft sides 30, 32 and opposed lateral sides 34 that are joined by four rounded corners 38. For reference, the sides 34 of the tank that face the lateral sides of the vehicle 12 are referred to as the lateral sides, and the sides 30, 32 of the tank (which, in this embodiment, are wider than the lateral sides) that face the fore and aft of the vehicle are referred to as the fore and aft sides, respectively. To facilitate molding, the illustrated sides of the tank taper outwardly toward the top of the tank. Optional curved support ribs 40 are molded in the lateral sides of the tank, providing increased strength. These ribs can bow inwardly or outwardly.

Mounting and Removal of the Receptacle

Figure 8:
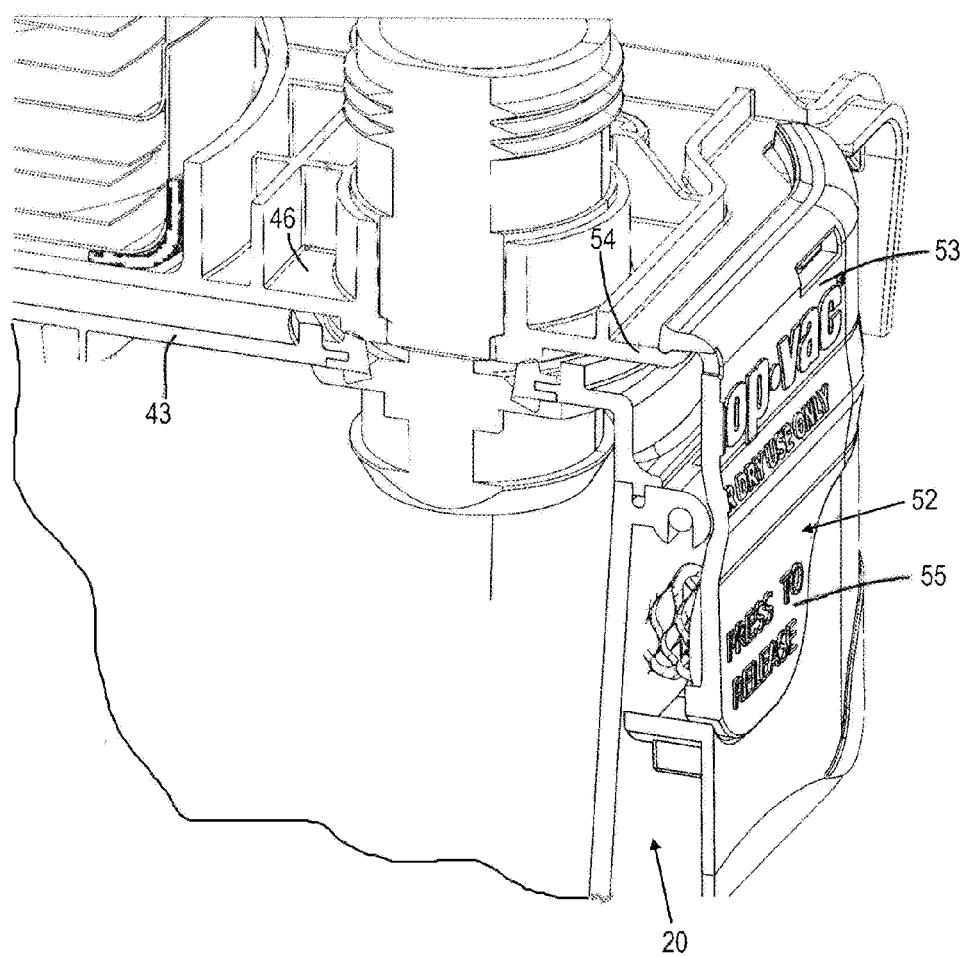
FIG. 8 is an enlarged fragmentary perspective of a portion of the vacuum cleaner.

As best seen in FIG. 8, the illustrated collection tank 20 is fitted with a removable lid 43 in a way that tanks of some conventional vacuum cleaners are fitted with a conventional vacuum cleaner power heads. The illustrated tank and lid form a removable unit that can be moved with respect to the rest of the vacuum cleaner 10 between a mounted position seen in FIG. 2 (for storage or active vacuuming) and a removed position seen in FIG. 4 (for emptying dirt and debris collected in the tank). As evident from FIG. 4, the lid 43 helps to reduce the chance of dirt or debris being spilled from the tank while the unit tank is being moved.

Figure 9:
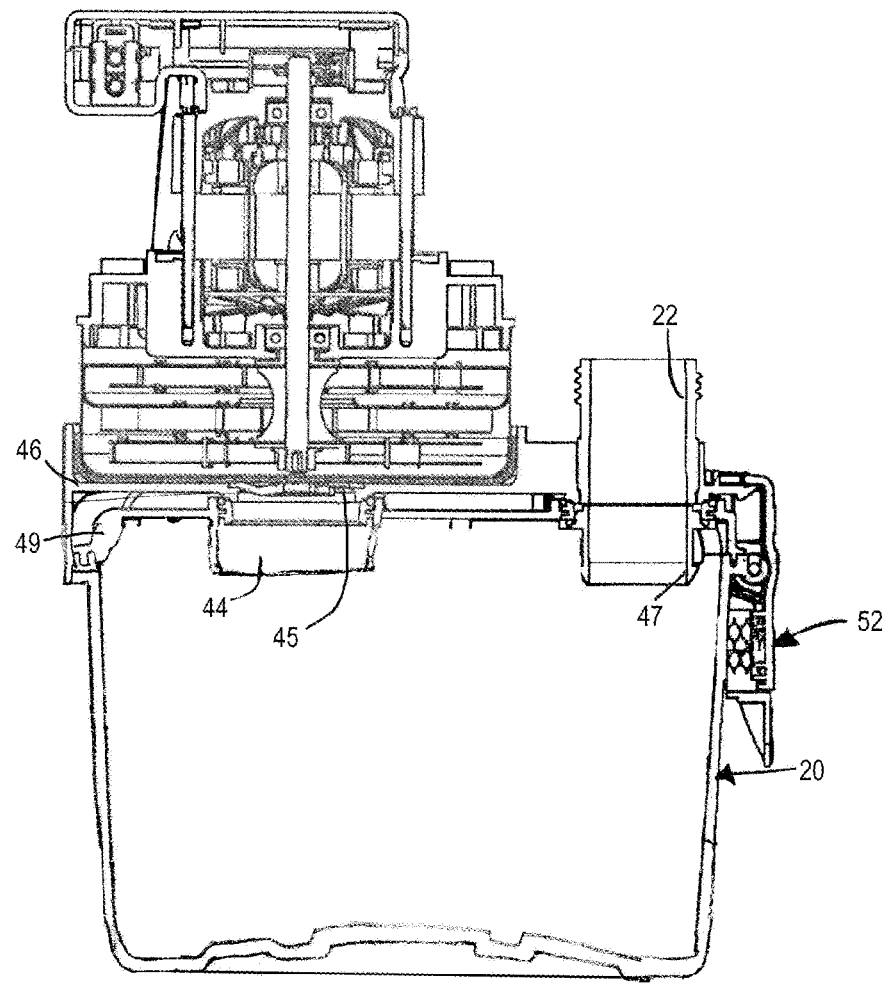
FIG. 9 is a cross-sectional view of the vacuum cleaner with the tank in a mounted position.

As best seen in FIG. 9, when the collection tank 20 is in the mounted position, an outlet 44 that is positioned on a rearward part of the lid 43 aligns with an impeller opening 45 on a chassis wall 46 of the vehicle 12, placing the interior of the tank 20 in fluid communication with the vacuum generator. At the same time, an inlet 47 that is positioned on a forward part of the lid aligns with a hose port 22. In this way, the vacuum generator can draw dirty air through the hose and through the inlet into the removable tank, where the dirt and debris can be collected.

The illustrated vacuum cleaner 10 is provided with structure that enables a user to conveniently remove the collection tank 20, disconnecting both the inlet 47 from the hose port 22 and the outlet 44 from the impeller opening 45 in a simple motion. This design also eliminates the need to separately disconnect the hose from the tank if the user desires to move the tank without having to also carry the hose.

Figure 10:
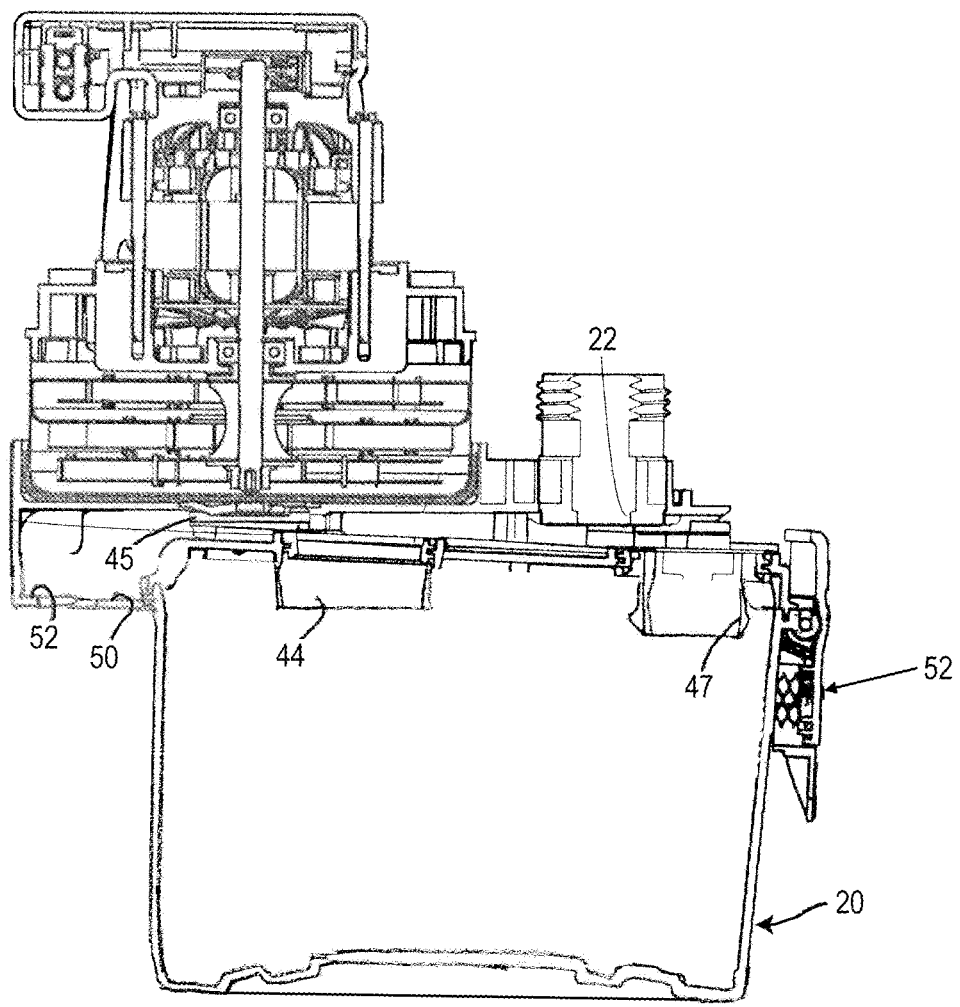
FIG. 10 is a cross-sectional view of the vacuum cleaner with the tank in a forward position.
Figure 11:
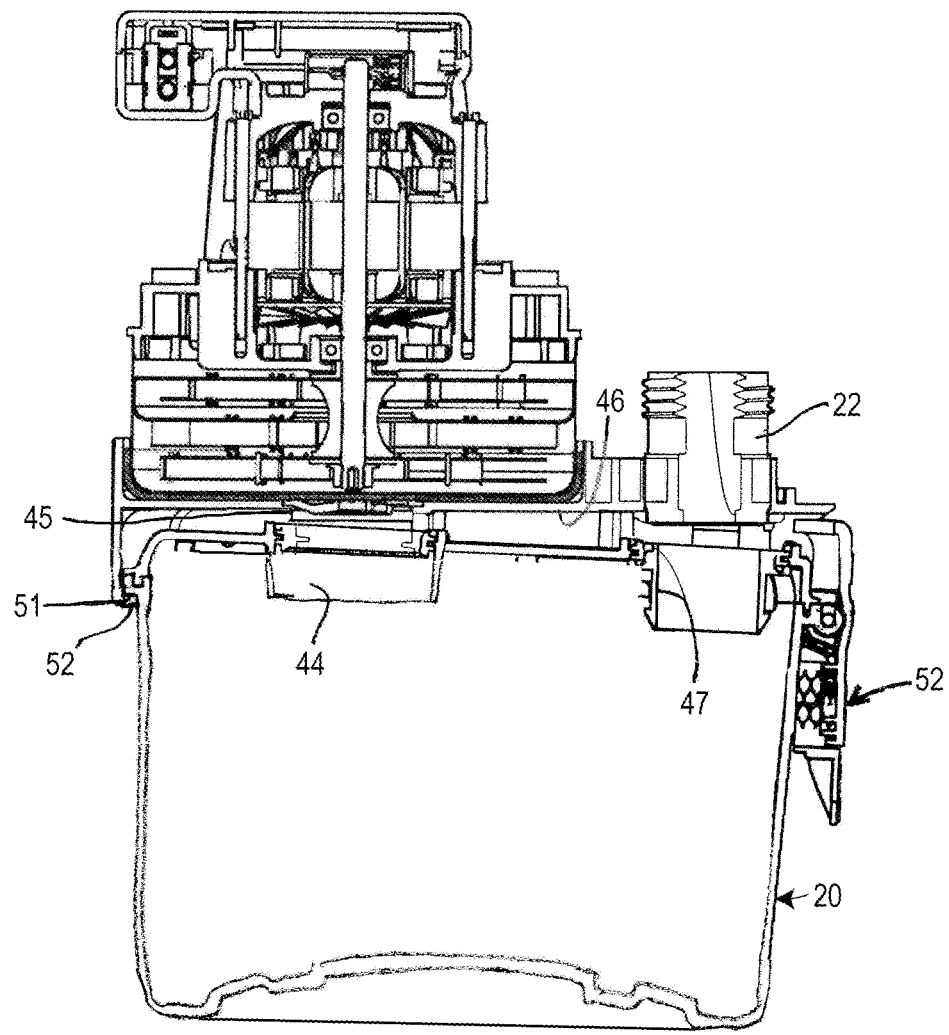
FIG. 11 is a cross-sectional view of the vacuum with the tank in a supported rearward position.

Although many different arrangements can be used for mounting the collection tank 20, installation and removal of the illustrated collection tank 20 is particularly useful and efficient. Narrow lateral flanges 49 (FIG. 4) are positioned on opposed sides of the tank. In this example, the flanges are positioned near the top of the side walls of the tank, but other arrangements are possible. These flanges fit onto narrow inclined ramp portions 50 (FIG. 10) within the vehicle 12. When resting upon the ramp portions, the flanges support the tank so that it can be moved in a gently inclined sliding motion that moves the tank from a forward position seen in FIG. 10 to a supported rearward position seen in FIG. 11. The angle of the ramp portions makes initial alignment of the tank on the ramp portions easier, and also enables any gaskets on the openings on the lid to pass beneath the forward edge of the chassis wall as the tank slides rearward.

The rearward part of the illustrated collection tank 20 has a narrow rear flange 51. When the tank is moved to the position seen in FIG. 11, the rear flange engages a lip 52 within the vehicle. In this rearward position, the angle of the ramp portions 50 leaves the forward part of the tank spaced somewhat beneath the upper forward edge of the chassis wall 46. The engagement between the lip and the rear flange supports the tank, and enables a user to pivot the forward part of the tank upwards, moving the tank from the position seen in FIG. 11 into the mounted position seen in FIG. 9. This upward pivoting motion also presses any gaskets at the inlet 47 and the outlet 44, sealing the connections there.

A release lever 52 helps to secure the collection tank 20 in the mounted position. Although other arrangements can be used, the release lever seen in FIG. 8 is connected to a forward part of the tank at a pivot. This release lever has an upwardly-extending latching arm 53. The arm can be spring-biased and can also be made of a resilient material to assist in latching. When the tank moves into the mounted position, a rearward-extending portion of the latching arm latches onto a horizontal latch edge 54 on the chassis wall 46, holding the tank in position.

A release arm 55 on the release lever 52 can be used to release the engagement of the latching arm 53. The illustrated release arm is located beneath the pivot. When the release arm is pressed rearward, the release lever rotates about the pivot, causing the latching arm to rotate forward. This motion slides the extending portion of the latching arm off the horizontal latch edge 54, removing the support of the forward part of the collection tank 20 and enabling the tank to pivot down from the chassis wall 46. The downward motion breaks any seals at the inlet 47 and the outlet 44 and takes the tank to the rearward position in which the lateral flanges 49 on the tank are supported by the angled ramp portions 50. From here, the user can slide the tank forwardly to remove the tank.

Noise

When a vehicle accelerates or decelerates, changing either speed or direction, debris such as gravel, food, etc. can roll or slide across a floor, causing noise. The speed of the movement can also increase the longer the acceleration or deceleration continues, causing noise itself, and increasing the noise when the debris strikes a side wall.

The Bottom of the New Product

Figure 5:
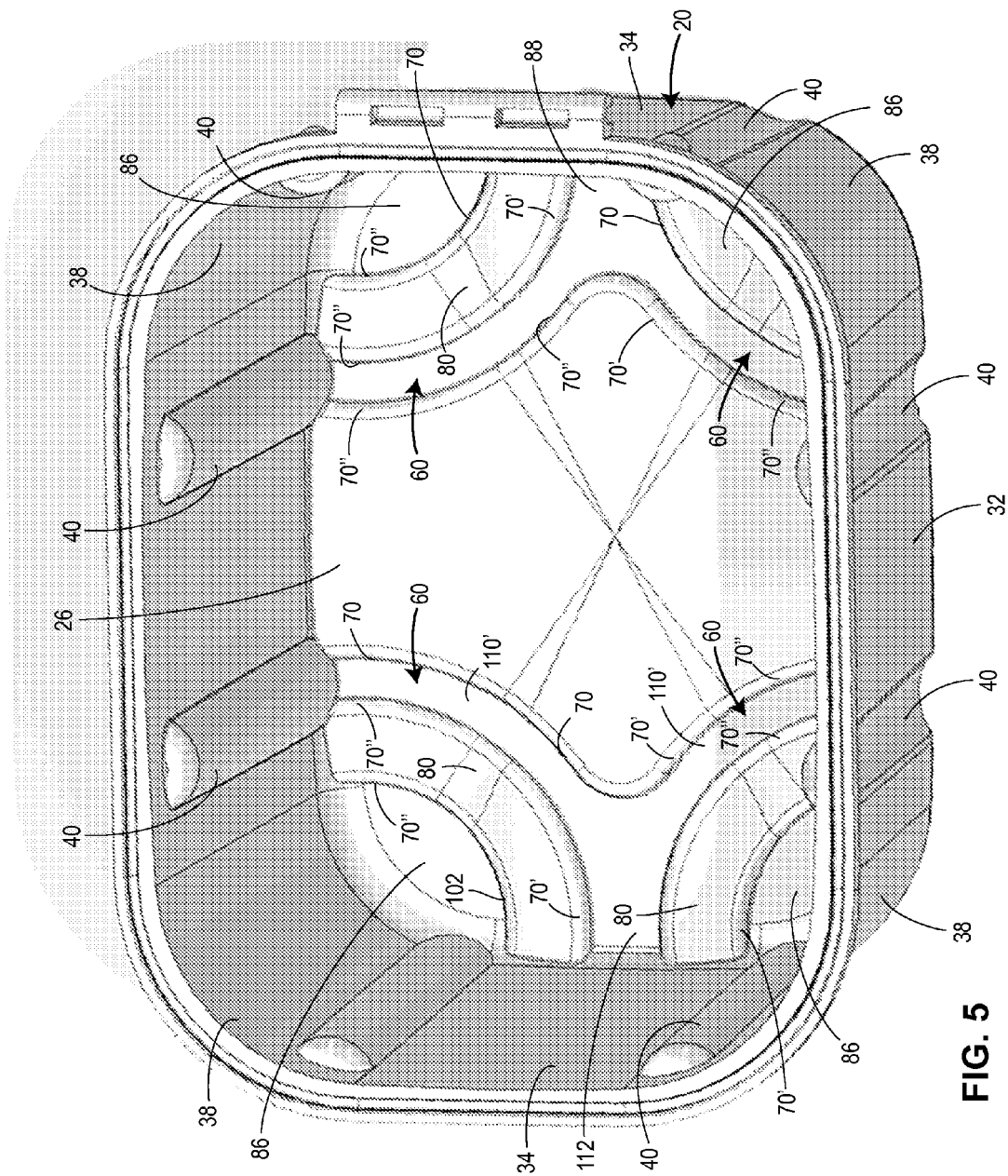
FIGS. 5 and 6 are perspective views of the bottom of the tank.
Figure 6:
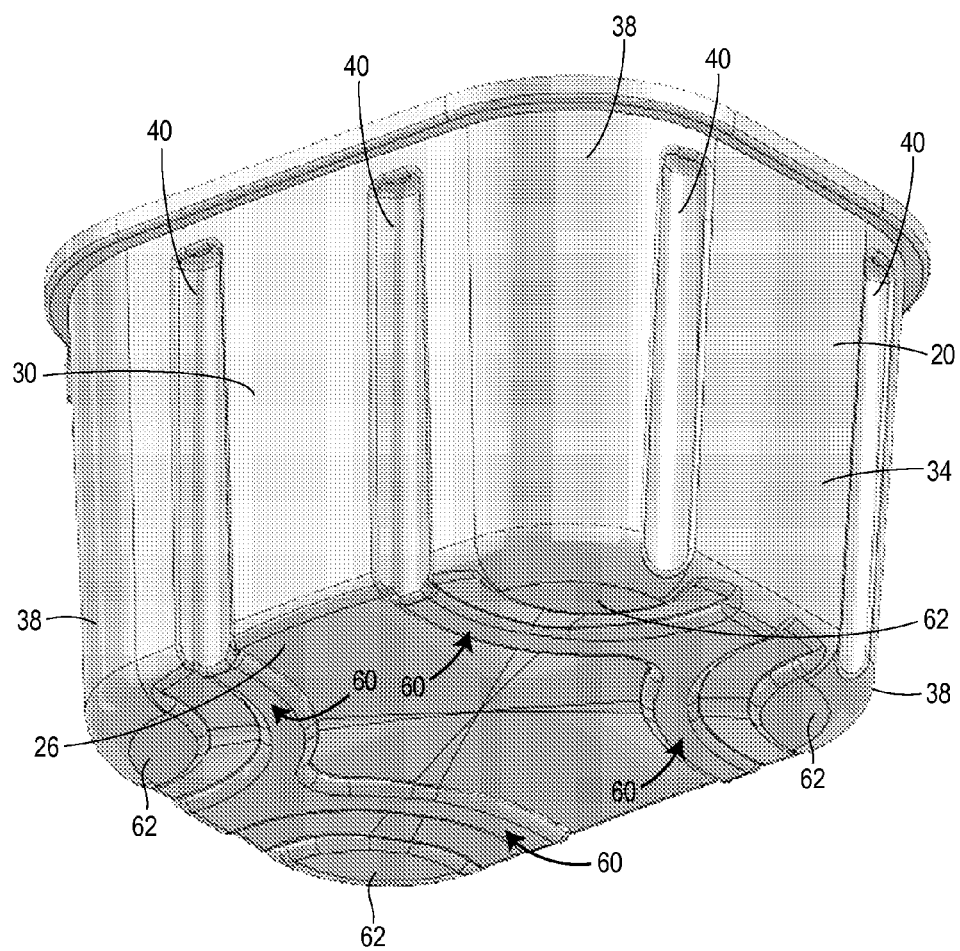
Figure 7:
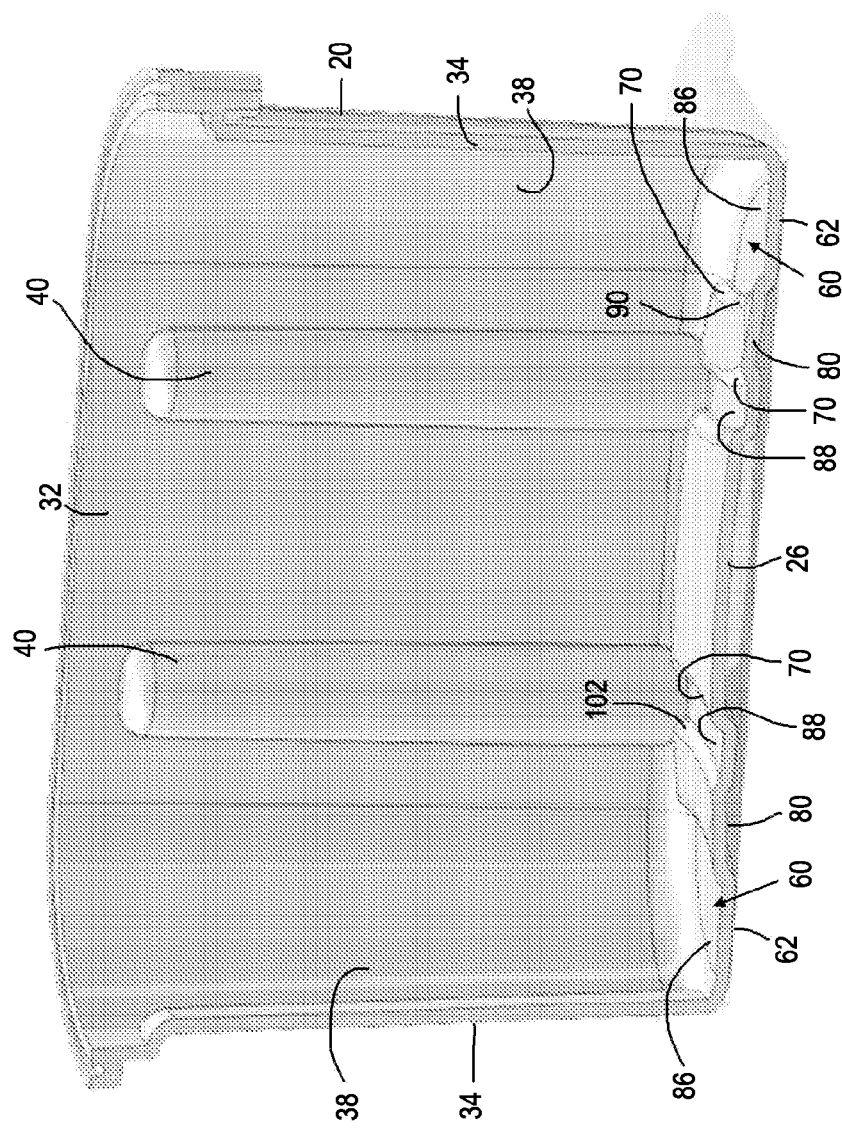
FIG. 7 is a cross-sectional view of the bottom of the tank.

As seen in FIGS. 5-7, the bottom 26 of the collection tank 20 on the new vacuum cleaner 10 has recesses 60 that help to reduce noise. As used here, "recess" means structure that forms a bowl, with a lowered central area surrounded by wall(s) or wall segments. The illustrated vacuum cleaner has four spaced recesses 60 on the bottom of the tank (or, equivalently, four spaced recesses defined by walls rising from the bottom.) Two recesses are adjacent each other in the corners 38 on one lateral side 3A of the tank, while the other two recesses are adjacent each other on the other side of the tank.

In the illustrated vacuum cleaner 10, the recesses 60 have lower surfaces 62 (FIGS. 6 and 7) that are located below a central part of the bottom 26 of the tank 20. Although not required to achieve some of the advantages of the new vacuum cleaner 10, these lower surfaces support the collection tank 20 in a standing position when the collection tank is removed from the rest of the vacuum cleaner. The lower surfaces can be formed during the molding process, and thus do not require separate elements to be connected to the tank to serve as legs.

In the illustrated vacuum cleaner 10, the bottom 26 of the collection tank 20 generally curves downwardly towards the wider fore and aft sides 30, 32 of the tank. Although this curvature may not always be necessary, in the disclosed vacuum cleaner the curvature helps to channel dirt and debris towards the fore and aft sides of the tank. Debris along the aft side 32 of the tank 20 will generally move very little when the automobile accelerates, such movement being blocked by the aft side itself. Similarly, debris along the fore side 30 will generally move very little when the vehicle decelerates (being blocked by the fore side). Using a curved surface for the bottom of the tank, instead of a tilted planar surface, provides a steeper angle near the sides, and thus does an even better job of resisting debris movement away from the sides.

In the same way that a tilt or curve of the bottom 26 of the collection tank 20 toward the fore and aft sides 30, 32 of the tank helps to channel debris toward the fore and aft sides, a tilt or curve of the bottom toward the lateral sides 34 of the tank helps to channel debris toward the lateral sides. In the illustrated product, the bottom of the tank is curved not only toward the fore and aft sides, but also toward the lateral sides. Debris along the left lateral side will generally move very little when the vehicle turns right (being blocked by that lateral side) and debris along the right lateral side will generally move very little when the vehicle turns left (being blocked by that lateral side).

In use, movement of the vehicle 12 urges debris on the bottom 26 of the collection tank 20 toward and into the recesses 60 in the corners 38 of the tank. Once in the recesses, wall segments 70 on the recesses inhibit both fore-and-back movement of the debris within the collection tank 20 and side-to-side movement of the debris. In particular, as best seen in FIG. 5, during acceleration, some of the wall segments 70 inhibit movement of debris toward the aft side 32 of the tank. During deceleration, some of the wall segments 70' inhibit movement of debris toward the fore side 30 of the tank. During movement to the left, some of the wall segments 70" inhibit movement of debris toward the right side of the tank. During movement to the right, some of the wall segments 70''' inhibit movement of debris toward the left side of the tank. The wall segments seen here curve into each other, forming two continuous curves, one on each lateral side of the center of the tank. Straight wall segments can also be used, and they can be joined by right angles rather than by curves. The height and inclination of the walls segments can vary, depending upon the type of debris that is expected to be of most concern.

To further inhibit movement of debris, the recesses 60 in the bottom 26 of the illustrated collection tank 20 are provided with one or more raised sections 80 that extend through the recesses 60, best seen in FIG. 7. When viewed from above, these raised sections curve convexly away from the center of the tank, and divide the recesses into four corner recess sections 86 and two offset recess sections 88.

Each of the corner recess sections 86 is positioned adjacent a corner 38 of the collection tank 20, and is bounded by one of the lateral sides 34 of the tank, one of the fore and aft sides 30, 32 of the tank, and by an outer wall segment 90 on the raised section (FIG. 7). The distance from the fore-most part of the fore side 30 to the aft-most point on the corner section is between ¼ and ½ of the distance between the fore and aft sides 30, 32. The lateral distance from the lateral wall 34 to the farthest point on the corner recess is between ⅛ and ⅓ of the distance between the lateral sides 34. This positioning of the outer wall segment helps to limit movement of debris within the corner recess to less than ½ of the movement that would occur in an identically-sized tank with no recesses in the bottom.

Each offset recess section 88 is positioned between the two corner recess sections 86 on either the fore or aft wall 30, 32 and the center of the tank 20, and is bounded by the wall segments 70 on each of the two recesses 60 on that side of the tank, and by inner wall segments 102 on the raised section 80 on that side of the tank (see FIG. 7). The maximum width of the offset section is between ⅟32 and ¼ of the distance between the lateral sides 34 of the tank. Some of the inner wall segments 102 block movement of debris in the offset recess section during acceleration, others 102' block movement of debris there during deceleration, while others 102" block movement of debris during movement to the right, and still others 102'" block movement of debris during movement to the left.

In the illustrated collection tank 20, each of the offset recess sections 88 has two tracks 110' that extend from an intermediate position 112 that is located adjacent one of the lateral sides 34 of the collection tank. Each of the two tracks extends in a different direction, one toward the fore side 30 of the tank, and the other toward the aft side 32 of the tank. The illustrated tracks extend toward the fore and aft sides of the tank in a curved configuration, matching the configuration of the wall segments 70 on the recesses 60 and thus minimizing the distance that debris within the recess can move in any direction before engaging a wall segment or a side of the tank.

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A vacuum cleaner that has:
a removable debris collection tank;
two or more recesses that are on a bottom of the collection tank;
wall segments on the recesses that inhibit both fore-and-back movement of debris within the collection tank and side-to-side movement of debris within the collection tank;
one or more raised sections that extend through the recesses, divide one of the recesses into two corner recess sections and an offset recess section, and inhibit both fore-and-aft movement of debris within the divided recess and side-to-side movement of debris within the divided recess; and
two tracks in the divided recess that extend in different directions, one lateral side of the tracks being formed by wall segments on the divided recess and the other lateral side of the tracks being formed by other wall segments on the raised section in the divided recess.

2. A vacuum cleaner as recited in claim 1, in which:
the two tracks extend from an intermediate position that is located adjacent a fore-and-aft side of the collection tank.

3. A vacuum cleaner as recited in claim 1, in which:
the bottom of the tank is generally curved downwardly towards fore-and-aft sides of the tank, and the two tracks extend from an intermediate position that is located between two corner recess sections, near one of the fore-and-aft sides of the collection tank.

4. A vacuum cleaner that has:
a removable debris collection tank;
two or more recesses that are on a bottom of the collection tank;
wall segments on the recesses that inhibit both fore-and-back movement of debris within the collection tank and side-to-side movement of debris within the collection tank;
one or more raised sections that extend through the recesses, divide one of the recesses into two corner recess sections and an offset recess section, and inhibit both fore-and-aft movement of debris within the recesses and side-to-side movement of debris within the recesses; and
two tracks in the divided recess that curve in different directions, one lateral side of the tracks being formed by wall segments on the divided recess and the lateral other side of the tracks being formed by other wall segments on the raised section in the divided recess.

5. A vacuum cleaner as recited in claim 4, in which:
the two tracks extend from an intermediate position that is located adjacent a fore-and-aft side of the collection tank.

6. A vacuum cleaner as recited in claim 4, in which:
the bottom of the tank is generally curved downwardly towards fore-and-aft sides of the tank, and the two tracks extend from an intermediate position that is located between two corner recess sections, near one of the fore-and-aft sides of the collection tank.

7. A vacuum cleaner that has:
a removable debris collection tank with corners that join generally planar lateral sides of the tank;
two or more recesses that are on a bottom of the tank;
wall segments on the recesses that inhibit both fore-and-aft movement of debris within the collection tank and side-to-side movement of debris within the collection tank; and
one or more raised sections that extend through the recesses, divide the recesses into multiple recess sections, and have inner and outer wall segments that, when viewed from above, curve convexly away from central portions of the bottom of the collection tank.

8. A vacuum cleaner as recited in claim 7, in which:
at least one of the one-or-more raised sections divides one of the recesses into two corner recess sections and an offset recess section that has two tracks that extend in different directions, one lateral side of the tracks being formed by wall segments on that recess and the other lateral side of the tracks being formed by other wall segments on that raised section.

9. A vacuum cleaner as recited in claim 8, in which:
the two tracks extend from an intermediate position that is located adjacent a fore-and-aft side of the collection tank.

10. A vacuum cleaner as recited in claim 8, in which:
the bottom of the tank is generally curved downwardly towards fore-and-aft sides of the tank, and the two tracks extend from an intermediate position that is located between two corner recess sections, near one of the fore-and-aft sides of the collection tank.

\* \* \* \* \*